May 6, 1958 | J. C. WARD | 2,833,869

POWER LAW AMPLIFIER

Filed Aug. 16, 1950

INVENTOR.
JULIUS C. WARD
BY H. A. Mackey
ATTORNEY.

United States Patent Office 2,833,869

Patented May 6, 1958

2,833,869

POWER LAW AMPLIFIER

Julius C. Ward, Pleasantville, N. Y., assignor to General Precision Laboratory Incorporated, a corporation of New York Application August 16, 1950, Serial No. 179,753

3 Claims. (Cl. 179—171)

This invention pertains to electronic discharge tube amplifiers and particularly to an amplifier in which the output voltage bears a power law relation of less than unity to the input voltage.

In the television art distortion of the contrast in the video picture occurs in the cathode ray receiving tube; the light emitted by the phosphor increases more than proportionally to the input video signal voltage, the increase generally obeying a simple power law. This enhances the contrast in the picture, so that when televising a "live" scene, employing an image orthicon tube as is the general practice, the lights on the cathode ray tube screen are lighter than they are in the "live" scene, and the shadows are darker. When the picture on the cathode ray tube screen is photographed, as by the use of the intermediate film process for large screen projection, it is highly desirable if not essential to employ positive release sound recording motion picture stock, to secure the advantage of its fine grain for good definition and of its hardened emulsion to permit use of rapid film processing methods. Such film however, has a gamma of 2½ or more, greatly aggravating the contrastiness of the resulting picture on film. In general, this high gamma film also obeys a simple power law in its distortion of contrast.

The amplifier of the instant invention provides a ready and convenient apparatus, not heretofore obtainable, for neutralizing, reducing or overcompensating for the contrast distortions caused by the inherent nature of the phosphor of the cathode ray tube screen and/or the photographic film emulsion. In general the circuit of the amplifier may be varied so that the degree of contrast obtained in the final picture may be varied as desired, the exact degree of contrast being a matter of esthetic appeal concerning which there is no present agreement.

The position at which the amplifier of the invention is inserted in the chain of television apparatus which may be said to extend from the live scene to the final picture as viewed is quite uncritical and in general it may be said that such an amplifier may be inserted at any point in the video network of the transmitting station to alter the characteristic of the video signal prior to modulation or on the other hand, the amplifier may be made a part of the equipment at the receiving station by its insertion at any point in the receiver video network thus acting to modify the characteristics of the video signal subsequent to its demodulation.

A purpose of the invention, therefore, is to provide an electronic circuit for compensating for the contrast-increasing effects inherent in the apparatus used in depicting television pictures.

A further purpose of the invention resides in the provision of an amplifier such that the output voltage thereof is a less than unity power of the input voltage.

A further understanding of this invention may be secured from the detailed description and the drawings, in which.

Figure 1:
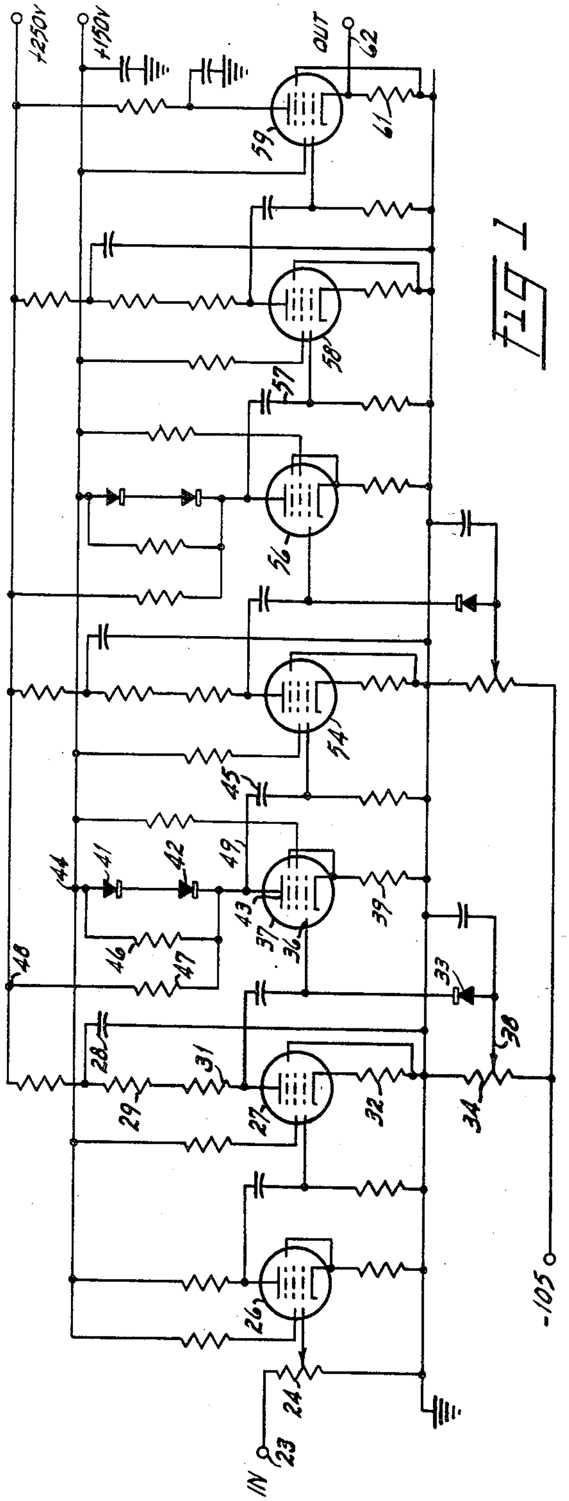
Figure 1 is a schematic illustration of the amplifier of the invention.

Referring now to Fig. 1, there is there disclosed an amplifier the output voltage of which is a selected less than unity power of the input voltage. Preferably the gain of the amplifier is unity at a reference level which is taken at the maximum white level and all video frequencies are passed equally so that no distortion or lack of definition is produced thereby.

A video signal is applied to the terminal 23 and impressed on the input of the tube 26 through the medium of a gain control potentiometer 24. The tube 26 acts merely as an inverter stage having approximately unity gain so that the proper phase relationships are maintained on the subsequent stages which produce the novel results.

The output derived from the tube 26 is applied to a first less than unity power law stage which consists of an amplifying pentode 27 having a gain of about 8 db and a power law tube 37 having a loss of about the same amount. The pentode amplifier 27 is made to amplify a broad band of signal frequencies of the usual 5 mc. bandwidth without distortion by the use of a small resistor 29 in series with a small resistance 31 connected between the anode of the pentode and a source of positive direct current potential, the whole being bypassed by a large condenser 28 connected between positive potential terminal of the resistor 29 and ground. A small amount of degeneration is also supplied by an unbypassed resistor 32 connected in the cathode lead.

The output of the amplifier 27 derived from its anode circuit is impressed on the input of the less than unity power law amplifier 37 whose function is to provide proportionally less gain for signals of the higher levels representing the more nearly white images than for the low level or more nearly black signals. Thus the circuit must be so phased that as applied to the input of this tube the higher potential signals are representative of the lighter portions of the transmitted image signal. For that reason, and under the assumption that the higher potential level signals represent the lighter portions of the image as impressed on the terminal 23, the inverter stage 26 is incorporated in the circuit so that there are two inversions of the signal which cancel each other prior to the imposition of the signal on the grid 36 of the tube 37. It will be obvious, of course, that if the signal impressed on the terminal 23 is inverted, that is, the higher potential levels represent the darker portions of the picture, then the stage 26 will be omitted and only a single inversion will be had in the amplifier stage 27.

In order that the black level may be maintained at the proper point as regards the signal impressed on the grid 36 of the tube 37 a direct current restorer is used consisting of a crystal rectifier 33 connected between the grid 36 and the sliding contact 38 of a potential divider the resistance of which is connected between a negative potential source indicated at −105 and ground. As is well understood by those skilled in the art such an arrangement prevents the grid 36 from becoming more negative than the potential of the slider 38 but permits it to assume any more positive potential. Thus adjustment of the slider 38 permits optimum adjustment of the black level at the input of less than unity power law amplifier tube 37.

The tube 37, being a pentode, has an anode current that is substantially proportional to control grid voltage impressed thereon over a considerable range of input magnitudes, and this property is utilized in securing a power of less than unity characteristic. This proportionality is aided by the use of some degeneration provided by an unbypassed cathode resistor 39 of 500 ohms. Three paths are provided for this anode current, the first consisting of two germanium crystals 41 and 42 connected in series between the anode 43 and a 150-volt positive supply terminal 44, the second consisting of a 1000 ohm resistor 46 shunting the crystals 41 and 42, and the third consisting of a 270,000 ohm resistor 47 connected between the anode 43 and a 250-volt positive terminal 48.

The sum of the potential drops produced by the anode current flowing in each of these paths determines the potential E at the anode 43 of the tube 37 at any instant of time and hence likewise the signal applied to the grid of the succeeding tube. In the instant circuit as heretofore stated it is desired that the variations in output potential follow a less than unity power law with respect to the input signal and each of the three paths contributes to this result as follows.

Figure 2:
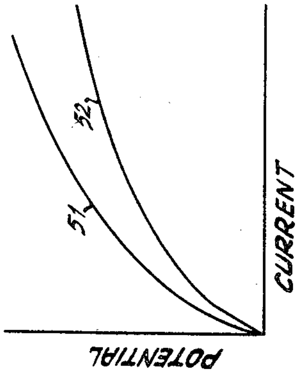

The voltage-current characteristic of a germanium crystal in its more conductive direction is illustrated by the curve 51 of Fig. 2 and may be expressed mathematically by the equation $$E=aI^{1/2} \qquad (1)$$

I being the current therethrough, E the potential drop thereacross and $a$ being a constant. In the instant case two crystals are used which merely doubles the potential drop but does not otherwise affect the relationship described.

In the actual circuit as illustrated, however, due to various extraneous non-linearities this ideal performance is not realized and the actual circuit conforms more nearly to a relationship which is expressed by the formula $$E=bI^{.7} \qquad (2)$$

E and I having values as indicated above and $b$ being a constant.

In order that the resistance through the crystals be limited in the reverse direction of current flow to prevent excessive below-black pulses being transmitted in the event that the control tube 37 is driven beyond the point where all current flow through the crystals is cut off and also to permit better control of signals at the zero signal, i. e., black level, the resistor 46 is placed in shunt to the crystal circuit and the combined characteristic of the resistor and crystal combination produces a characteristic as illustrated at 52 of Fig. 2 wherein the lower portion is linear and the upper working range has a slope in accordance with the exponent of Equation 2.

Figure 3:
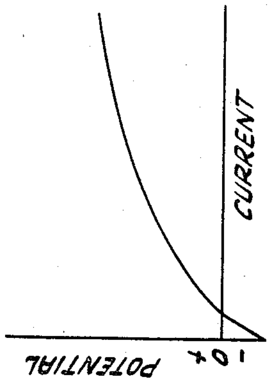
Figures 2 and 3 are curves serving to illustrate the operation of the amplifier of Fig. 1.

As heretofore stated a pentode has an anode current which is substantially proportional to the potential impressed on its control grid but there is a departure from this linear relationship at very low anode currents so that to insure that the tube is operated at all times on the linear portion of its characteristic, the resistor 47 is connected in the circuit to insure some anode current flow even in the absence of current flow through the diodes 41 and 42. Using the values as heretofore given by way of example, there is produced in the resistor 47 a current flow of approximately 0.37 milliampere at all times so that the total current flowing through the pentode constitutes the sum of the currents in all three paths. i. e. the resistor 47, the resistor 46 and the crystals 41 and 42, and this over-all current characteristic is illustrated in Fig. 3 wherein the total current through the pentode is plotted against the potential drop across the crystals.

This characteristic approximates most nearly the desired exponential relation in its positive voltage region beginning at a point where the current flowing through the crystals is .05 milliampere and in operation the circuit is best adjusted by variation of the grid bias so that at no signal or black-level condition this amount of current flows through the crystals which also results in a concomitant anode current flow through the resistor 46 of about 0.02 milliampere. Thus the voltage current characteristic over the desired operating range may be expressed by the equation $$E=c(d+I^{.7}) \qquad (3)$$

$c$ being a constant and $d$ being the sum of the currents flowing in the resistors 46 and 47 and the crystals 41 and 42 under no signal conditions.

The potential which varies in this exponential law relationship is applied to a second similar stage consisting of a pentode 54 and power law amplifier 56 through the medium of the conductor 49 and coupling condenser 45 and since this second stage is similar in all respects the total amplification characteristic of the two stages is expressed by the equation $$E=f(k+I^{.49}) \qquad (4)$$

$f$ and $k$ being constants.

In general compensation for excess contrast produced by a cathode ray tube screen phosphor and positive film is obtained by a signal output which varies in accordance with the relation $$S_0=S_i^{.5} \qquad (5)$$

$S_0$ being the output signal and $S_i$ the input. Hence Equation 4 above very nearly satisfies this requirement and two power law stages connected in cascade are satisfactory for the purpose intended. It will, of course, be appreciated that the exponent of the equation may be altered by using other numbers of stages resulting in different amounts of contrast correction, a single stage reducing if not fully correcting contrast errors introduced by phosphor and film emulsion and more than two stages overcompensating for contrast distortions.

Inasmuch as it is frequently desired to connect an amplifier such as here described to a low impedance load, the output of the second power law stage is connected to an inverter 58 which reverses the phase so that high signal level represents the light portions of the picture and the signal output of this stage is impressed on a cathode follower stage 59, the output of the entire circuit being derived by a conductor 62 from a 1000 ohm resistor 61 connected in the cathode circuit of the cathode follower 59.

In operation and to produce the best correction of contrast values the signal impressed on the amplifier input should have a magnitude of between one and two volts and this optimum value may be readily obtained by adjustment of the potential divider 24. Other values of signal can be used but with less satisfactory results. Likewise it will be recognized that where the phase relation of the signal impressed on the input is other than as here described the phase inversion stages 26 and 58 may be dispensed with, the only criterion being that as impressed on each power law stage the signal be so phased that the higher potentials represent the light picture portions.

What is claimed is:

1. An amplifier of the class described comprising, a thermionic tube having at least an anode, cathode and control electrode, means for impressing an input signal on said control electrode, a nonlinear resistance circuit including at least one germanium crystal connected in series between said anode and a positive terminal, said crystal being so poled as to be more conductive in the direction toward said anode, a resistor connected in shunt to said nonlinear resistance circuit, a second resistor connected between said anode and a second positive terminal, and an output circuit connected to said anode.

2. An amplifier of the class described comprising, a first tube having a selected gain, a second tube having its input coupled to the output of said first tube, said second tube having a loss which is approximately equal to the gain of said first tube, an anode-cathode circuit for said second tube including a source of potential connected between the anode and cathode thereof, at least one germanium crystal connected in series in said anode-cathode circuit, said crystal being so poled as to be more conductive in the direction toward said anode, and an output circuit connected to derive an output signal from the potential drop produced across said germanium crystal.

3. An amplifier of the class described comprising, a first tube having a selected gain, a second tube having its input coupled to the output of said first tube, said second tube having a loss which is approximately equal to the gain of said first tube, an anode-cathode circuit for said second tube including a source of potential connected between the anode and cathode thereof, at least one germanium crystal connected between said anode and said source of potential, said crystal being so poled as to be more conductive in the direction toward said anode, a resistor connected in shunt to said germanium crystal and an output circuit connected to said anode.

References Cited in the file of this patent

UNITED STATES PATENTS

| | | |
|---|---|---|
| 2,017,192 | Wolf | Oct. 15, 1935 |
| 2,167,462 | Rechnitzer | July 25, 1939 |
| 2,240,289 | Dillenburger et al. | Apr. 29, 1941 |
| 2,240,600 | Applegarth | May 6, 1941 |
| 2,431,317 | Earp et al. | Nov. 25, 1947 |
| 2,457,131 | Curtis | Dec. 28, 1948 |
| 2,464,708 | Moseley | Mar. 15, 1949 |
| 2,525,103 | Sprecher | Oct. 10, 1950 |
| 2,548,901 | Moe | Apr. 17, 1951 |
| 2,550,960 | Brabham | May 1, 1951 |
| 2,603,708 | Anger | July 15, 1952 |
| 2,642,526 | Gallay | June 16, 1953 |

FOREIGN PATENTS

| | | |
|---|---|---|
| 580,880 | Great Britain | Sept. 24, 1946 |